United States Patent [19]
Conforti

[11] 4,348,129
[45] Sep. 7, 1982

[54] COUPLING JOINT

[76] Inventor: Maurizio Conforti, Via Bietoletti 21, Sesto Fiorentino (FI), Italy

[21] Appl. No.: 30,168

[22] Filed: Apr. 16, 1979

[30] Foreign Application Priority Data

Apr. 14, 1978 [IT] Italy ................................. 9416 A/78

[51] Int. Cl.³ .............................................. F16B 7/00
[52] U.S. Cl. ...................................... 403/218; 52/280
[58] Field of Search ............... 403/217, 218, 170, 171, 403/172, 173, 174, 175, 176, 177, 178; 52/280, 283, 236.3

[56] References Cited

U.S. PATENT DOCUMENTS

| | | | |
|---|---|---|---|
| 2,018,539 | 10/1935 | Welsh | 403/218 |
| 3,507,526 | 4/1970 | Packman et al. | 403/173 |
| 3,563,581 | 2/1971 | Sommerstein | 403/217 |
| 3,973,855 | 8/1976 | Florence | 403/171 |
| 4,021,127 | 5/1977 | Gasparro | 403/171 |

FOREIGN PATENT DOCUMENTS 1071700  6/1967  United Kingdom .................. 52/280

Primary Examiner—Andrew V. Kundrat
Attorney, Agent, or Firm—McAulay, Fields, Fisher, Goldstein & Nissen

[57] ABSTRACT

Disclosed is a six-way joint for connecting tubular elements and supporting the edges of panels and walls, formed of two, separable, complementary, shell-shaped members, each having a central base; channels extending from the base along a first plane such as to form, when the members are assembled by their base, four sockets for accommodating the ends of the tubular elements; an opening in the base along a second plane perpendicular to the first; a peg in the opening for receiving the ends of two other tubular elements; seats extending outwardly from the base parallel to the channels; horizontal gussets coplanar with the base between the seats and removable fastening means passing through the peg.

5 Claims, 2 Drawing Figures

COUPLING JOINT

The present invention relates to six-way joints for connecting tubular elements and supporting the edges of panels and walls.

The problem of how to assemble three tubular elements is particularly important in the scaffolds, in window-dressing and in decorating of shops, libraries, stores, fairs, and in many other constructions of composite type. It is the object of the present invention to provide a six way joint for assembling a plurality of rods in the three orthogonal and concurrent directions, for removably connecting a plurality of rods, in horizontal coplanar and orthogonal association, forming also the removable joint seat for one or two vertical rods and for the telescoping of both parts of the horizontal rods as well. The invention also provides a supporting seat of a removable joint for one or more (up to four) horizontal rods and/or one or more vertical walls. Another characteristic of the invention is that it is formed by two separable, complementary members symmetrically units along a connecting plane. A further characteristic of the invention is that it requires only a screw for locking the two members. Another advantage is that it can be made of rigid plastic material.

These and other advantages and characteristics of the invention will be better understood by those skilled in the art from the following description and accompanying drawings, showing an exemplary embodiment of the invention wherein.

Figure 1:
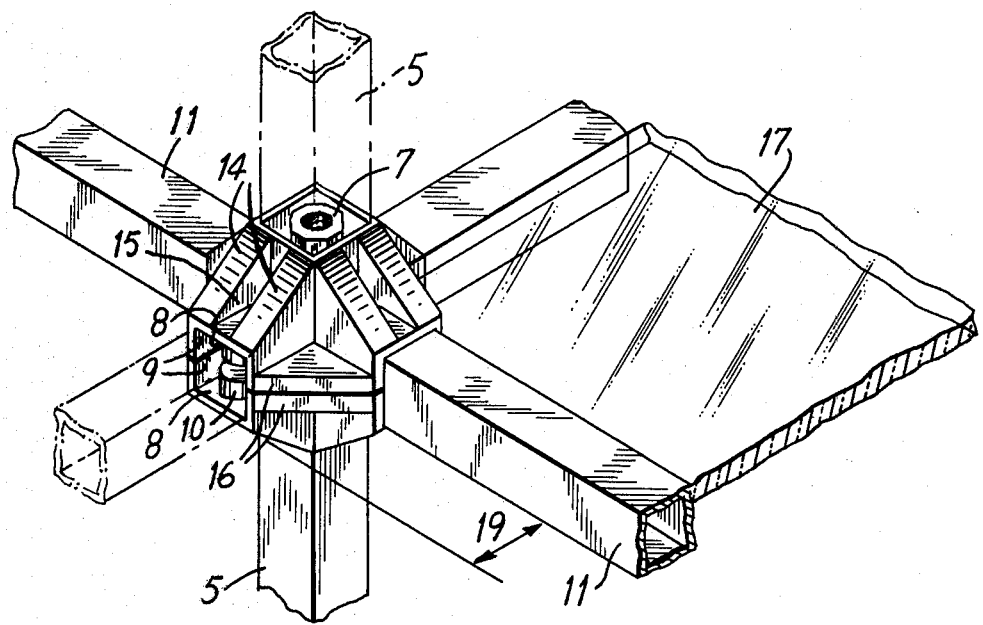
FIG. 1 is an isometric view of the joint of the invention shown in use.
Figure 2:
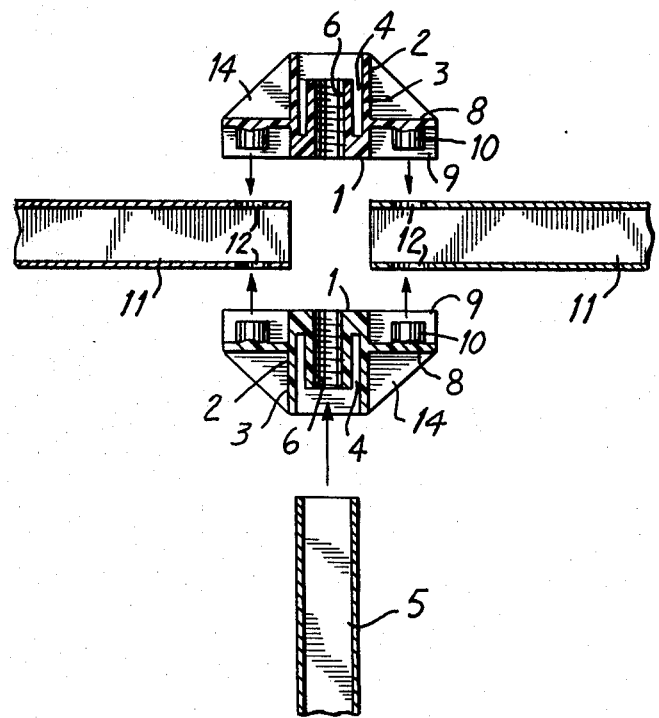
FIG. 2 is an exploded view of a cross section taken in a vertical plane direction of the joint.

Reduced to its essential structure and with reference to the accompanying drawings, a joint according to the invention includes two equal and opposite members, each consisting of: (1) A central body (1) with a square base, having double, coaxial and opposite walls, which are able to define a dead, annular cavity having a square section, which is open at one end, and forms the seat of a removable slip joint for a tubular vertical rod having a corresponding size and square section 5, and a central threaded bore 6 coaxial to the body (1) which is provided to receive a bolt (7) for connecting and locking the two members; The height of the internal walls (3) of the body (1) is advantageously less than that of the external walls (2) to house the nut of the bolt inside the upper part of the body (1). The joint also has four equal channels forming a cross, projecting from the base of the body (1) toward the outside, and each of which is made up of a horizontal wall (8) and of two longitudinal vertical wings (9) forming a socket. A cylindrical tenon (10) is provided which projects from the side of the wall (8). The tenon suitably is shorter than one of the wings (9) and acts as a male element of a male-female connection for one of the tubular rods (11) to be assembled horizontally. The lower base of wings (9) is coplanar to the base of body (1) and the height of the wings is equal to half the one side defining the section of the rod to be assembled permitting a slip connection with one rod (11) in two opposite walls and where, through the rod, a hole (12) is provided to receive the tenon (10). The joint also includes four pairs of triangular ears (14), the ears of each pair being mutually parallel and placed between the wall (8) of the channels and the wall (2) of the central body (1) so as to define, with (2) and (8), a seat (15) of rectangular shape open upward by and forming a movable slip joint for the edges of panels (not shown in the drawing for the sake of simplicity) made up of glass, metal, rigid plastic material, wood or other suitable material. The joint also includes four triangular horizontal gussets (16), coplanar to the base of the central body (1) placed between the adjacent wings (9) of two of the channels to define the connecting plane of the two members as well as a movable slip joint seat, in cooperation with wings (9) and ears (14), for a horizontal pane (17) made up of glass, wood, rigid plastic material, metal or other suited material. It is also possible to make a joint, according to the invention, with a rigid plastic material like PVC or Nylon in different sizes, for assembling metallic tubular rods of corresponding sections whose length is changeable at will, within broad limits, in the three orthogonal directions. In practice, the construction details may vary according to the shape, dimensions, elements dispositions, nature of the material used, without departing from the spirit and scope of the claimed invention.

What we claim is:

1. A six-way joint for assembling a plurality of tubular rods in three orthogonal and concurrent directions, comprising, combination:

two separable, complementary, shell-shaped members, each member having a central base;

four channels extending from said base along a first plane and forming, when said members are assembled, sockets receiving each a rod;

an opening in said base along a plane perpendicular to said first plane;

a peg in said opening, said peg having a bore therethrough, said peg being adapted for connection to the end of a rod;

seats extending outwardly from said base parallel to said channels but on different planes;

horizontal gussets between said seats and coplanar with said base, and fastening means passing through said bore in said peg for securing together said members.

2. The joint of claim 1, wherein said sockets are rectangular in cross-section.

3. The joint of claim 1, wherein said opening in said base is rectangular in cross-section.

4. The joint of claim 1, wherein said peg is shorter than said base.

5. The joint of claim 1, wherein said channels include internal tenon means serving as the male element of a male-female connection with one of said rods.

* * * * *